March 10, 1964 G. L. COX 3,124,715

STORAGE DEVICE

Filed Sept. 16, 1960

INVENTOR
Glenn L. Cox
BY
Charles F. Renz
ATTORNEY 3,124,715
STORAGE DEVICE

Glenn L. Cox, Elmira, N.Y., assignor to Westinghouse Electric Corporation, East Pittsburgh, Pa., a corporation of Pennsylvania Filed Sept. 16, 1960, Ser. No. 56,572
4 Claims. (Cl. 315—10)

Figures 1, 2:
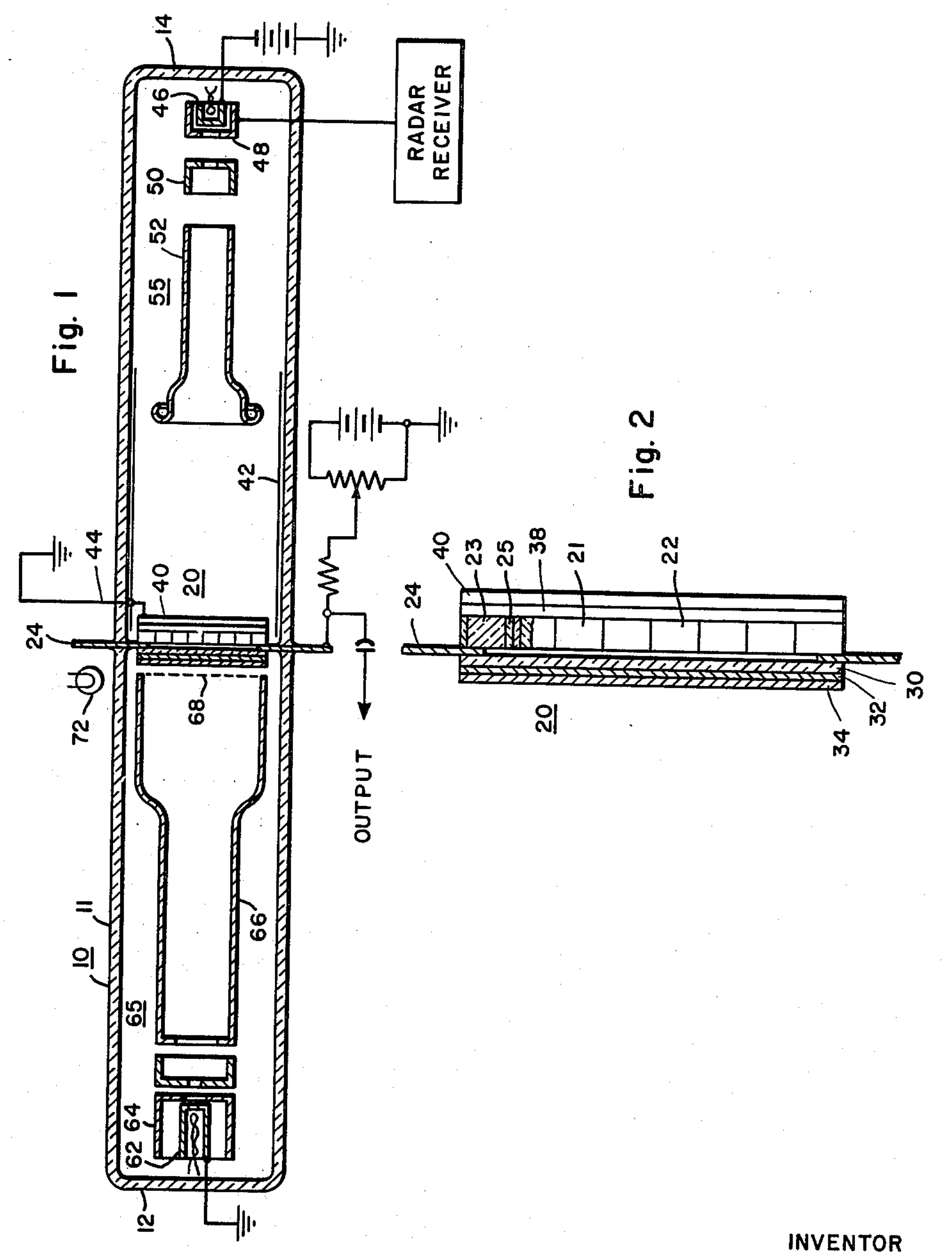

This invention relates to a storage system and more particularly to an electronic tube which may be utilized to store information and provide read out under many different conditions.

There is a growing need for a charge storage tube for use in data processing applications where signal information may be continuously transformed, with minimum loss in detail, from one time base or scanning presentation to another. Such a tube is normally referred to as a scan conversion storage tube. It is also desirable to have a device in which information may be read out in a different form from that in which it was written. For example, information may be generated by a radar installation such as might be obtained in airport surveillance. In such an application it is desirable to write the radar information into a storage device, usually in the form of a PPI display, and then read the information out at the same time or at a later time. It may be desirable to read the information out at the same speed as the write in or at a different speed or it may be desired to connect the PPI display to a raster display. This information is then displayed on a suitable display device such as a television monitor.

Electronic devices to provide the above functions are not new in the art but those that do exist suffer from limitations such as size, complexity of operation, complicated switching problems for the proper functioning of the device, short storage, poor resolution and a tendency for the writing signal to appear directly in the output circuit.

It is accordingly an object of this invention to provide an improved storage tube.

It is another object to provide an improved scan conversion storage tube.

It is another object to provide an improved electronic device in which electrical information can be written and read simultaneously.

It is another object to provide an improved electronic device in which electrical information may be written into a charge storage target and the information read out simultaneously without disturbing either the write in or read out functions.

It is a further object to provide an improved electronic device for storage which will provide longer storage time.

It is a further object to provide an improved storage device which lends itself to more simple circuitry requirements.

It is another object to provide an improved storage device which will provide multiple read out copies of a single stored image without substantially deteriorating the information on the storage target.

It is another object to provide a storage device in which the storage time of the target can readily be adjusted.

It is another object to provide an improved storage device which enables the stored information to be displayed on one or a number of display devices simultaneously.

In accordance with the objects this invention provides an electronic storage tube comprised of at least two electron guns, at least one gun being used for reading and at least one gun being used for writing. The writing and reading guns are geometrically opposed and impinge on opposite sides of a target structure. The target structure consists of a fiber optic support plate coated on the writing side thereof with a phosphor and provided on the opposite side or read side with a storage photoconductive material which exhibits the property of storage of an information pattern including half tones and discharging said pattern in a predetermined time. The photoconductive layer also exhibits the property of retaining said stored pattern for a greater length of time than said predetermined time in response to electron bombardment.

These and other objects are effected by my invention as will be apparent from the following description taken in conjunction with the accompanying drawings, in which:

FIGURE 1 is a schematic representation of a storage tube embodying my invention; and FIGURE 2 is an enlarged sectional view of the target structure utilized in FIGURE 1.

Referring in detail to FIGURES 1 and 2, an electronic storage tube is provided comprising an evacuated envelope 10 of a suitable material such as glass. The envelope 10 consists of a tubular body portion 11 closed at each end by suitable stem members 12 and 14 through which lead in members are provided to supply voltages to the electrodes within the envelope 10. The tube may be considered to include two sections, namely, a writing section and a reading section. A planar storage target 20 is positioned perpendicular to the axis of the tubular portion 11 of the envelope 10 and centrally located within the envelope 10. The storage target assembly 20 consists of a fiber optic support plate 22 mounted on a metal ring 24. The metal ring 24 extends through the wall of the device and is provided with a vacuum tight seal to the wall of the envelope 10. The metal ring 24 may be of a suitable material such as Kovar and is secured to the fiber optic support plate. The fiber optic support plate 22 consists of thousands of glass fibers 21 having their axis parallel to the tube axis. The plurality of fibers 21 are fused together side by side so that each fiber can pick up light on one end and deliver it to the other end. The fiber optic bundle behaves as a lens having a numerical aperture of approximately .7 such that an image implanted on one surface is transferred through the fibers to the other surface with almost no loss of resolution and with very little brightness loss. This feature enables the electrical separation of the two modes of operation yet retains resolution and provides a strong body structure. Each glass fiber 21 consists of a core portion 23 of a suitable glass such as SF–4 (Schott) having a high index of refraction, and a jacket portion 25. A suitable material for the jacket 25 being any thermally compatible glass having a lower index of refraction than the core 23. The jacket portion 25 may be provided with a light absorptive coating. The diameter of the core portion 23 should be less than 0.001 inch to provide the desired resolution.

On the left side or the reading side of the fiber optic support plate 22 as shown in FIGURE 1, there is deposited a transparent electrically conductive coating 30 of a suitable material such as tin oxide and on top of this is deposited a thin film 32 of a suitable photoconductive storage material such as arsenic tri-selenide. A coating 34 of antimony trisulphide is deposited on top of the layer 32 of arsenic triselenide. The layer 32 of arsenic triselenide is a homogeneous mixture of arsenic and selenium. The coating 32 is evaporated onto the electrically conductive layer 30. One specific example of fabrication of the storage layer 32 is to take 300 milligrams of high purity selenium and 150 milligrams of chemically pure arsenic and then heat this mixture slowly to 500° C. in atmosphere thus causing the selenium to melt and take the arsenic into solution. It is then necessary to continue to heat slowly with agitation until a homogeneous molten mixture is obtained. The agitation of the mixture is to prevent segregation of the selenium. This heating is continued for approximately 5 minutes and a homogeneous mixture is obtained in the melt without evaporation of the selenium. After a homogenous mixture has been obtained, the mixture is allowed to solidify and cool. The specific example given above provides a 2 to 1 ratio by weight of selenium to arsenic and this mixture has been found to yield excellent results. It has also been found that other proportions are possible such as a 1 to 1 ratio. The impurity content is less than 1% in this mixture. The resulting homogeneous mixture of arsenic and selenium may then be evaporated onto the electrical conductive layer 30 on the support plate 22. This can be accomplished by placing the face plate in a container capable of being evacuated. A small quantity of about 60 milligrams of a homogeneous mixture of arsenic and selenium is suitable for depositing a layer on a 1 inch diameter target. The amount of material utilized, of course, will depend on the area and thickness of layer desired. The mixture is then placed in a boat of a suitable material such as Nichrome, inserted into the container and positioned at a distance of approximately 4 inches from the target. The system is then evacuated to a pressure of less than about .5 micron. The boat is heated to approximately 400° C. The temperature depending on the desired speed of evaporation. The heat is continued for approximately 3 to 4 minutes until a target thickness of about 5 microns is obtained. The system is then opened to the atmosphere and a boat is inserted containing about 60 milligrams of antimony trisulphide. The antimony trisulphide is heated to a temperature of about 450° C. and the material is deposited on the arsenic and selenium layer 32 until a thickness of also about 5 microns is obtained.

Another suitable structure that can be disposed on the reading side of the fiber optic support plate is an evaporated coating of indium on the electrical conductive coating of tin oxide. A coating of arsenic triselenide is deposited as previously described. The layer of antimony trisulphide is not required.

On the right hand side of the target 20 or the write side of the target 20, a coating 38 of phosphor is provided of suitable spectral emission to excite the photoconductive layer 32 provided on the opposite side of the fiber optic support plate. This phosphor may be deposited in the conventional manner by liquid settling or it may be deposited by an electrophoretic coating technique that utilizes very fine particle phosphor to obtain a thin, dense screen capable of very high resolution without loss due to light scattering in the phosphor. A suitable phosphor material is zinc sulfide silver. A coating 40 of electrically conductive material may be provided on the phosphor layer 38 of a material such as aluminum for providing an electrode connection to the phosphor layer 38. The conductive coating 40 may be electrically connected to a wall coating 42 which may be of a suitable material such as graphite and these two elements are provided with a lead-in 44 to the exterior of the envelope 10. The two elements 40 and 42 form the anode of the writing section of the tube. The rest of the writing gun 55 consists of a cathode 46, a control grid 48 and accelerating electrodes 50 and 52. The cathode 46 of the write gun 55 may be operated at a potential of about 11,000 volts negative with respect to the voltage applied to the layer 40. The layer 40 is usually operated near ground potential. Suitable deflection means (not shown) may be provided exterior of the envelope for deflecting the writing beam to scan a desired display on the target member 20. The information to be stored on the tube comes from a suitable device such as a radar receiver and the signals thereby derived are applied to the control grid 48 of the writing gun.

The reading electron gun 65 which is positioned on the left hand side of the target 20 consists of at least a cathode 62, a control grid 64 and an anode 66. Also in close proximity to the surface of the photoconductive storage layers 32 and 34 is a collector mesh 68 which is operated at the same potential as the anode 66. Again, suitable deflection means (not shown) well known in the art are provided exterior of the envelope 10 for deflecting the electron beam from the gun 65 and also suitable focusing means may also be provided to focus the low velocity beam generated by the reading gun 65. The cathode 62 of the read gun 65 may be operated at a potential of about ground potential and the layer 30 is operated at about ten volts positive with respect to ground potential.

In the operation of the writing section of the tube, the writing electron gun 55 is modulated with the information to be stored supplied in the form of time spaced potential voltage pulses to the control grid 48 of the electron gun 55 from the radar receiver 52. The write gun 55 which is operating at a high potential of the order of 11,000 volts is capable of very high resolution. Utilizing the configuration shown within the writing section of the tube, a spot size of less than 0.001 inch may be readily achieved. The electron beam from the gun 55 striking the phosphor layer 38 provides a spot of extremely small size on the phosphor layer 30 causing it to fluoresce brightly. The emitted light from the phosphor layer 38 is reflected by the aluminum backing layer 40 and passes into one or more of the fibers 21 which comprise the fiber support plate 22. The fibers 21 prevent the light from straying in any direction other than along the axis of the tube. The fiber optic plate 22 may be of any thickness but in the specific application a thickness of approximately ⅛ of an inch is entirely adequate. The diameter of the core of the fibers 21 should of course be comparable to or less than the electron beam spot size from the write gun 55. The light image thus generated within the phosphor layer 38 in response to electron bombardment by the writing electron gun 55 passes through the fiber optic support plate 20 and induces conductivity within the photoconductivity storage layer 32. The equilibrium charge previously established on the exposed surface of the photoconductive storage member comprised of layers 32 and 34 is modulated in accordance with the induced conductivity to bring the surface of the photoconductive storage layer 34 toward the potential of the electrically conductive coating 30. The conductive coating 30 may be operated at a potential of about 10 volts positive with respect to ground. The equilibrium charge pattern established on the photoconductive storage member prior to excitation or writing on the target member 20 is established by scanning the reading electron beam from the gun 65 over the storage surface. Due to secondary emission from the surface of the photo-conductive storage member the surface of layer 34 will tend to charge toward the potential of the cathode 62 of the reading gun 65 which is operated at ground potential. The equilibrium potential of the surface will be at approximately ground potential. Thus, the surface of the photoconductive storage layer 34 will tend to charge toward the potential of the electrically conductive coating which is at a positive potential of 10 volts. The unmodulated low velocity beam generated by the reading gun 65 will therefore scan the exposed surface of the layer 34 of photoconductive material and in those areas where the equilibrium charge has been modified due to conductivity set up within the storage member a corresponding signal will be derived from the flange member 24. The signal current thus derived is connected to an output and may then be amplified, processed and finally transmitted or displayed.

It is a further property of the photoconductive storage member of layers 32 and 34 that the change in conductivity caused by light excitation may be retained for any desired period of time due to the simple agency of the proper choice of potential applied to the layer 30 of target electrode 20 in relation to the potential of the cathode 62 of the reading gun 65. It is also required that a steady scansion of the target surface by the low velocity beam produced by the reading gun 65 be provided to cause the retention of the storage information within the target member 20. By such a system, one is able to obtain multiple copy read out from the target 20 without substantially deteriorating the contrast of the multiple copies. The storage time of the target 20 can be adjusted as previously indicated by adjusting the potential on the conductive back plate 30 of the photoconductive storage element with respect to the cathode 62 of the reading gun 65. The utilization of the fiber optic support plate 22 between the two sections inhibits interference between the writing and reading sections. Also, by utilization of the photoconductive storage material disclosed herein, a flicker-free read out of extended duration may be displayed on conventional monitors. Also, by proper preparation of the photoconductive stored material, a relatively rapid decay in the signal output may be obtained so that the image will decay in approximately two minutes.

It is also possible, if one desires, to erase the stored image by other methods. The fastest method of erase of the stored image is to switch off the read gun 65 and at the same time illuminate the entire area of the photoconductive storage member directly with strong light. Therefore, if desired an external light source 72 immediately surrounding the target 20 may be provided. In a specific embodiment shown, an auxiliary light source 72 such as a gas discharge lamp is utilized. Light erasure may also be achieved by scanning the entire surface with an unmodulated electron beam from a write gun, at a controlled intensity. A third method of erasing the stored pattern is to switch off the reading electron gun 65. In this method, it may take approximately eight seconds to effect adequate erase and this may be considered to be too long a time for some operational conditions.

Another advantage of the utilization of the material disclosed in the photoconductive storage member is that the material is capable of integrating the in-coming light information and thus the effective sensitivity will be considerably increased.

It is also obvious that a large area photoemissive input screen may be utilized in place of the writing gun 55. In this case, the radiation image would be directed onto a photoemissive layer which would in turn generate an electron image which would be accelerated to bombard the layer 38.

The device can process storage information and is limited only by the capabilities of the storage surface. The write gun can be made to produce a spot less than .0005 inch in diameter if desired. The fiber optic light transfer enhances the resolution and brightness in comparison with conventional light transfer means.

While I have shown my invention in only a few forms, it will be obvious to those skilled in the art that it is not so limited but is susceptible of various changes and modifications without departing from the spirit and scope thereof.

I claim as my invention:

1. An electrical discharge system comprising an electron storage tube having a target electrode positioned therein, said target electrode including a fiber optic support plate consisting of a first and second end face with a plurality of light transmitting fibers between said end faces, a layer of phosphor positioned and supported on said first end face of said fiber optic plate and an electrically conductive layer positioned and supported on said second end face of said fiber optic support plate, a photoconductive storage member provided on said electrically conductive layer and exhibiting the property of storing an information pattern including half tones in response to light excitation and discharge of said information pattern in a predetermined time in the absence of electron bombardment, said photoconductive storage member also exhibiting the property of retaining said information pattern for a greater length of time than said predetermined time in response to a constant current of electrons, means positioned on one side of said target for directing a first electron beam modulated with information to be stored onto said phosphor layer to generate a light pattern corresponding to said information to be stored which is in turn transmitted through said fiber optic support plate to said photoconductive member to thereby modify the conductivity of said photoconductive member corresponding to said light pattern, means for directing a second electron beam onto said photoconductive member and means associated therewith to derive a signal representative of the conductivity image impressed on said photoconductive member while simultaneously providing retention of the stored image within the photoconductive member for a greater length of time than said predetermined time.

2. An electron discharge device for storage of electrical signals comprising a target member including a fiber optic member consisting of first and second end faces with a plurality of light transmission members between said end faces, an electrically conductive light transmissive electrode member positioned on said first end face of said fiber optic member, a photoconductive member positioned on said electrical conductive member, said photoconductive member having the property of storing an information pattern including half tones in response to directing a light information pattern onto said photoconductive member and discharge of said information pattern in a predetermined time in the absence of electron bombardment, said photoconductive member also having the property of retaining said stored pattern for a greater length of time than said predetermined time in response to a constant current of electrons, a phosphor layer positioned on the second end face of said fiber optic member means for directing a first electron beam onto said phosphor layer modulated with information to be stored to generate a light image which is in turn transmitted through said light transmissive members in said fiber optic member to said photoconductive member to modify the resistivity of said photoconductive member corresponding to the light image directed thereon means for directing a second electron beam onto said photoconductive member and circuit means connected to said electrically conductive layer to derive a signal therefrom representative of the stored information on said photoconductive member in response to electron bombardment of said photoconductive member by electrons with said second electron beam, simultaneously causing retention of the stored information within said electron bombardment of said photoconductive member for a greater length of time than said predetermined time.

3. An electronic charge storage system comprising an electron storage tube including a target electrode, said target electrode including a fiber optic support plate consisting of a first end face and a second end face parallel to said first end face and having a plurality of light transmitting fibers perpendicular to said end faces a layer of a phosphor material capable of emission of radiation in response to electron bombardment positioned adjacent to said first end face and supported thereby, an electrical conductive layer positioned adjacent to said second end face and supported thereby said conductive layer transmissive to radiations from said phosphor layer, a photoconductive storage means deposited on said electrically conductive layer exhibiting the property of storing charge information including half tones in response to light excitation and discharge of said pattern in a predetermined time in the absence of electron bombardment, said photoconductive means also exhibiting the property of retaining said stored pattern for a greater length of time than said predetermined time in response to a constant current of electrons, said photoconductive storage means including a layer of material comprised of arsenic and selenium, means for directing an electron beam modulated with information to be stored onto said phosphor layer to generate a light image corresponding to the information to be stored within said phosphor layer which is in turn transmitted through said plurality of light transmitting fibers in said fiber optic support plate to modify the conductivity within said photoconductive means and establish a charge on the surface of said photoconductive means corresponding to the light image directed thereon, means for directing an unmodulated electron beam over the surface of said photoconductive means and circuit means associated with said electron beam means and said electrical conductive layer to derive a signal from said conductive layer representative of the image impressed on said photoconductive means.

4. A device for storage of electrical signals comprising a target member including a fiber optic plate consisting of a first and second end face and a plurality of light transmissive fibers positioned perpendicular to the end faces of said support plate, a layer of phosphor material capable of emission of light in response to electron bombardment adjacent said first end face, and a storage material layer adjacent said second end face exhibiting the property of storing information in response to light excitation and discharge of said information in a predetermined time in the absence of electron bombardment, said storage material layer also having the property of retaining said stored information for a greater length of time than said predetermined time in response to electron bombardment of said storage material layer, means for directing a first electron beam modulated with information to be stored onto said phosphor layer to generate a light image corresponding to the information to be stored, said light image transmitted through said plurality of light transmitting fibers in said fiber optic plate to said storage material layer to impress a light image on said storage material layer corresponding to the light image generated by said phosphor layer and thereby induce a modification in the characteristic of said storage material layer whereby a charge image is established on the surface of said storage material layer corresponding to said modification of the characteristics of said storage material layer, means for directing a second electron beam onto said storage material layer and circuit means associated with said storage material layer and said second electron beam to derive a signal from said system representative of said charge image on said storage material layer means while simultaneously retaining the stored image within said storage material layer for a greater length of time than in the absence of electron bombardment.

References Cited in the file of this patent

UNITED STATES PATENTS

| | | |
|---|---|---|
| 1,780,364 | Reynolds | Nov. 4, 1930 |
| 2,826,714 | Forgue | Mar. 11, 1958 |
| 2,864,031 | Smith | Dec. 9, 1958 |
| 2,890,361 | Boulet et al. | June 9, 1959 |
| 2,965,783 | Jaffee | Dec. 20, 1960 |

OTHER REFERENCES

Davidson, RCA TN 136, Mar. 12, 1958.

Morton et al.: RCA TN 268, June 1959.

Fiber Optics and Their Application to Electronic Tubes, by Stow Westinghouse Publication, Sept. 27, 1960.